United States Patent [19]

Honsberg

[11] 4,325,989

[45] Apr. 20, 1982

[54] SEAMABLE UNCURED CHLOROSULFONATED POLYETHYLENE

[75] Inventor: Wolfgang Honsberg, Wilmington, Del.

[73] Assignee: E. I. Du Pont de Nemours and Company, Wilmington, Del.

[21] Appl. No.: 181,728

[22] Filed: Aug. 27, 1980

[51] Int. Cl.$^3$ .............................................. B05D 7/04
[52] U.S. Cl. ................................... 427/160; 428/189; 428/192; 428/341
[58] Field of Search ................ 427/160; 428/192, 189, 428/341

[56] References Cited

U.S. PATENT DOCUMENTS 3,043,709 7/1962 Amborski ...................... 427/160 X
3,297,462 1/1967 Fanning ............................. 427/160
3,987,001 10/1976 Wedel et al. .................... 427/160 X

OTHER PUBLICATIONS

European Rubber Journal, J. Bament, "Calendering a Specialty Elastomer (CSP)", Sep., 1976, pp. 24–26 & 30.
Ciba-Geigy Product Data Sheets, "Tinuvin ® 320" and Tunuvin ® 327.

*Primary Examiner*—James R. Hoffman

[57] ABSTRACT

A sheet of uncured chlorosulfonated polyethylene having from about 0.3–4 mg/sq. cm of an ultraviolet light absorber deposited on a portion of its surface. The treated sheet can be exposed to ultraviolet light, and it retains seamability and can be securely seamed or bonded to another sheet of chlorosulfonated polyethylene by conventional procedures.

7 Claims, No Drawings

SEAMABLE UNCURED CHLOROSULFONATED POLYETHYLENE

BACKGROUND OF THE INVENTION

This invention is directed to a seamable chlorosulfonated polyethylene sheet and a process for its preparation.

Sheets of chlorosulfonated polyethylene have been used successfully for roofing and pond and pit liners. The calendered sheets of uncured chlorosulfonated polyethylene are laid side-by-side and overlap at the edges of each sheet where they are to be seamed together by conventional means, for example, hot air welding or adhesive seaming. However, when sheets of uncured chlorosulfonated polyethylene have been exposed to sunlight for a short time, for example, two or three days when stored out of doors at a job site, the seam adhesion of the chlorosulfonated polyethylene sheets is adversely affected and, in many cases, it can no longer be seamed together. For example, when sheets that have been exposed to sunlight for eight hours are heat welded, a secure weld does not develop, and one does not obtain weatherproof bonding of the sheets that is essential when constructing pond or pit liners or when the sheets are used for roofing. Up to the time of the present invention, the uncured chlorosulfonated polyethylene sheets were covered with black polyethylene film so that they could be welded together. This procedure is both expensive and inconvenient.

SUMMARY OF THE INVENTION

It has now been discovered that a sheet of uncured chlorosulfonated polyethylene having from about 0.3–4 mg/sq. cm of an ultraviolet light absorber deposited on a portion of its surface preserves seamability, and the sheet can be exposed to ultraviolet light. Preferably, the chlorosulfonated polyethylene used has from about 20–30% by weight chlorine and from about 0.7–1.4% by weight sulfur. Retaining seamability of a sheet of chlorosulfonated polyethylene is accomplished by applying from about 0.3–4 mg/sq. cm of an ultraviolet light absorber on that portion of the surface of the sheet of uncured chlorosulfonated polyethylene that is to be seamed to another sheet of uncured chlorosulfonated polyethylene. The ultraviolet light absorber can be applied as a solution in a solvent or as a dust. Preferably, and most efficiently and effectively, the ultraviolet light absorber is deposited on the uncured chlorosulfonated polyethylene sheet as a solution in a solvent either sprayed or painted on the sheet, usually on one or more edges of the sheet to be seamed. The treated sheets of uncured chlorosulfonated polyethylene can then be exposed to sunlight, and they retain seamability.

DETAILED DESCRIPTION OF PREFERRED EMBODIMENTS

Any uncured chlorosulfonated polyethylene can be treated with the ultraviolet light absorber. Generally, the uncured chlorosulfonated polyethylene contains 20–30% by weight chlorine, preferably 22.5–25% by weight chlorine, and 0.7–1.4% by weight sulfur, preferably 0.88–1.12% by weight sulfur. The preferred polymer has 25% chlorine and 1% sulfur. The compounded chlorosulfonated polyethylene sheet is usually from about 0.5–0.75 mm thick. In addition to having a sheet made of only chlorosulfonated polyethylene, the sheet can be made of a mixture of chlorosulfonated polyethylene and up to 25% by weight of chlorinated polyethylene or up to 15% by weight of polyvinyl chloride, or mixtures thereof. Best results are obtained if no more than about 10% by weight of chlorinated polyethylene and/or polyvinyl chloride is present in the chlorosulfonated polyethylene sheet.

Any ultraviolet light absorber can be used to coat the surface of the chlorosulfonated polyethylene sheet. The amount of ultraviolet light absorber applied to the chlorosulfonated polyethylene sheet is within the range of from about 0.3–4 mg/sq. cm. If less than about 0.3 mg/sq. cm are used, the seamability after exposure to ultraviolet light is only marginal; and when the concentration of ultraviolet light absorber is much in excess of about 4 mg/sq. cm, seamability begins to diminish. Preferably, the concentration of ultraviolet light absorber is from about 0.8–3 mg/sq. cm, and most preferably 1–2 mg/sq cm. Representative ultraviolet light absorbers that can be used in the present invention include the 2-hydroxy-benzophenones; the 2-(2'-hydroxyphenyl)-benzotriazoles such as 2-(3',5'-di-tertiary-butyl-2'-hydroxyphenyl)-5-chlorobenzotriazole; 2-(3'tertiary-butyl-2'-hydroxy-5'-methylphenyl)-5-chlorobenzotriazole; 2-(2'-hydroxy-5'-methylphenyl(benzotriazole; 2-(3',5'-dialkyl-2'-hydroxyphenyl)benzotriazole; the salicylates such as phenyl salicylate; p-tert-butylphenyl salicylate; p-tert-octylphenyl salicylate; dipropylene glycol salicylate, and 2-ethylhexyl salicylate; the aryl-substituted acrylates such as ethyl 2-cyano-3,3-diphenylacrylate; 2-ethylhexyl 2-cyano-3,3-diphenylacrylate; butyl 2-cyano-3-methyl-3-(p-methoxyphenyl)-acrylate; methyl 2-cyano-3-methyl-3-(p-methoxyphenyl)-acrylate; N-($\beta$-cyano-$\beta$-carbomethoxyvinyl)-2-methylindoline; and the p-aminobenzoates.

The ultraviolet light absorbers can be applied to the chlorosulfonated polyethylene sheet by painting or spraying a solution of the ultraviolet light absorber in a solvent onto that portion of the sheet that will be bonded to another sheet of chlorosulfonated polyethylene. Usually, the ultraviolet absorber is applied along an edge of the sheet to a width of from about 2–12 cm. Any solvent can be used because it is merely a vehicle for applying the ultraviolet light absorber. Preferably, the solvent is an organic solvent that is volatile at about ambient temperatures. Most preferably, the solvent not only dissolves the ultraviolet light absorber but also dissolves or swells chlorosulfonated polyethylene. Representative solvents that dissolve ultraviolet stabilizers and that can be used in this invention include chlorinated solvents, for example, methylene chloride, trichloroethane, chloroform and the like; aromatic hydrocarbon solvents, such as benzene, toluene, xylene, alkyl ester of lower fatty acids having 2–8 carbon atoms, such as butyl acetate or ethyl acetate; and aliphatic alcohols having 1–4 carbon atoms. When the ultraviolet light absorber is applied to the chlorosulfonated polyethylene sheet in solution in an organic solvent, the amounts of ultraviolet absorber applied to the sheet is easily controlled, and this makes for ease of application.

Although less preferable, the ultraviolet light absorber can also be applied to the chlorosulfonated polyethylene sheet by dusting on small solid particles of the order of from about 50–1000 microns that stick to the uncured sheet of chlorosulfonated polyethylene.

The uncured chlorosulfonated sheet can optionally contain the commonly used fillers, pigments and processing aids, such as carbon black, clay, titanium dioxide, stearamide, polyethylene glycol, etc. The amount of fillers, pigments and processing aids added should not exceed about 55% by weight of the total polymer composition. Also, as is conventional practice, the uncured chlorosulfonated polyethylene sheet can be fabric reinforced with nylon or polyester fabric sandwiched between two sheets of the polymer to provide additional strength.

The uncured chlorosulfonated polyethylene can be seamed by conventional hot air welding techniques. The hot air welding machine runs along the full length of the edges of the sheets that are to be seamed and heat welds the overlapping layers together. The chlorosulfonated polyethylene sheet can also be adhesively seamed, for example, using a 6% solution of chlorosulfonated polyethylene in trichloroethylene. The resulting adhesive is applied on both faces of the sheets to be joined, followed by one or two rollers travelling behind the adhesive applicator.

EXAMPLE

The invention is more thoroughly illustrated by the following example in which parts and percentages are by weight unless otherwise indicated.

Chlorosulfonated polyethylene having the formulation shown below in Table I was compounded on a rubber mill at about 60° C. for about 10 minutes.

TABLE I

| Ingredient | Parts (by weight) |
| --- | --- |
| Chlorosulfonated polyethylene (25 wt % Cl, 1 wt % S) | 100 |
| Calcium carbonate (Atomite Whiting) | 50 |
| Titanium dioxide (Tipure 960) | 50 |
| Stearamide (Kemamide) | 0.5 |

Samples A, B, and C of uncured chlorosulfonated polyethylene stock prepared from the above formulation were sheeted out and molded in a press for 3 minutes at 160° C. (Sample B also contained 1 part by weight of polyethylene glycol and Sample C 2 parts by weight, added to prevent calender sticking). The smooth sheets, which had a thickness of 75 mil (1.9 mm) were cut into 2.5×7.6 cm (1×3 in.) test specimens. A portion of a solution of 2.1 g of the ultraviolet light abosrber 2-(3',5'-di-tert-butyl-2'-hydroxyphenyl)-5-chlorobenzotriazole ("Tinuvin" 327 ultraviolet absorber) in 10 ml trichloroethylene was applied by brush evenly to one surface of the specimens to provide different concentrations of ultraviolet light absorber, as indicated in Table II. Specimens of a control sample were untreated. The specimens were then exposed to a sun lamp (GE, 275 watt) for six days, positioned about 0.7 of a meter from the lamp. The test specimens were subsequently bonded together by heat seaming the surfaces to which the ultraviolet light absorber was applied. The control specimens were bonded in the same manner. The specimens of chlorosulfonated polyethylene were heat seamed by exposing the surface for 5 minutes to an infrared lamp (Sylvania, 250 watt) and then each specimen was contacted under slight pressure to seam the sheets. The peel strength of the seam or bond of the specimens was then determined according to ASTM D-1876, except that the bond length of the specimen was about 7.6 cm and the average of two specimens was taken, and the results of the test are given below in Table II.

TABLE II

Effect of Ultraviolet Absorbers on Seamability of Chlorosulfonated Polyethylene

| Sample | Peel Strength (kN/m) | | |
| --- | --- | --- | --- |
| | A | B | C |
| Original | 8.6 | 8.7 | 8.9 |
| After 6 days exposure- GE sun lamp | | | |
| 0 mg/sq cm | | | |
| Tinuvin 327* 0.4 mg/sq cm | .03 | .08 | 0 |
| Tinuvin 327* 0.8 mg/sq cm | 2.2 | 2.3 | 1.2 |
| Tinuvin 327* 1.6 mg/sq cm | 3 | 5.2 | 3.5 |
| Tinuvin 327* Dusted on | 5.9 | 3.8 | 6.3 |
| Tinuvin 327* 0.8 mg/sq cm | 6.6 | 1.7 | .5 |
| Tinuvin 320** | 2.8 | 3.1 | — |

*Tinuvin 327 = 2-(3',5'-di-t-butyl-2'-hydroxyphenyl)-5-chlorobenzotriazole
**Tinuvin 320 = 2-(2'-hydroxy-3',5'-di-t-butylphenyl)-benzotriazole The above experiments show that seamability of the treated uncured chlorosulfonated polyethylene is preserved after exposure of the sheets to ultraviolet lights, whereas after six days' exposure to ultraviolet light little, if any, seamability is retained by the untreated chlorosulfonated polyethylene.

I claim:

1. A process for retaining seamability of a sheet of uncured chlorosulfonated polyethylene which comprises applying from about 0.3-4 mg/sq cm of an ultraviolet light absorber dissolved in an organic solvent to the surface of a sheet of uncured chlorosulfonated polyethylene having from about 20-30% by weight chlorine and from about 0.7-1.4% by weight sulfur that is to be seamed to another sheet of uncured chlorosulfonated polyethylene.

2. A process of claim 1 where the amount of ultraviolet light absorber is from about 0.8-3 mg/sq cm.

3. A process of claim 1 where the amount of ultraviolet light absorber is from about 1-2 mg/sq cm.

4. A process of claim 1 where the uncured chlorosulfonated polyethylene contains up to about 25% by weight of total polymer of chlorinated polyethylene.

5. A process of claim 1 where the ultraviolet light absorber is a 2-(2'-hydroxyphenyl)benzotriazole.

6. A process of claim 1 wherein the ultraviolet light absorber is 2-(3',5'-di-t-butyl-2'-hydroxyphenyl)-5-chlorobenzotriazole.

7. A process of claim 1 wherein the ultraviolet light absorber is 2-(2'-hydroxy-3',5'-di-t-butylphenyl)-benzotriazole.

* * * * *